United States Patent
Farrington

[19]

[11] Patent Number: 5,883,795
[45] Date of Patent: Mar. 16, 1999

[54] CLAMP CIRCUIT FOR A POWER CONVERTER AND METHOD OF OPERATION THEREOF

[75] Inventor: Richard W. Farrington, Heath, Tex.

[73] Assignee: Lucent Technologies Inc., Murray Hill, N.J.

[21] Appl. No.: 67,525

[22] Filed: Apr. 28, 1998

[51] Int. Cl.$^6$ .................................................. H02H 3/335
[52] U.S. Cl. ........................................................... 363/21
[58] Field of Search ................................. 363/20, 21, 97, 363/123, 131

[56] References Cited

U.S. PATENT DOCUMENTS

| | | | |
|---|---|---|---|
| 5,471,376 | 11/1995 | Tsai et al. ................................... | 363/20 |
| 5,598,324 | 1/1997 | Imamura et al. ........................... | 363/21 |
| 5,602,724 | 2/1997 | Balakrishnan ............................. | 363/21 |
| 5,734,563 | 3/1998 | Shinada ..................................... | 363/21 |

OTHER PUBLICATIONS

"Analysis and Design of R–C–D Clamp Forward Converter" by C.S. Leu. G.C. Hua and F.C. Lee—VPEC. Virginia Tech. Blacksburg. VA; C.Zhou—Delta Power Electronics Lab. Inc. Blacksburg. VA; pp. 113–118.

"A Novel Lossless Snubber Circuit" by Lj. Dj. Varga and N.A. Losic; 1989 IEEE; pp. 40–45.

"Analysis of a Resonant Reset Condition for a Single–Ended Forward Converter" by Naoki Murakami and Mikio Yamasaki; Apr. 1988; pp. 1018–1023.

"Design Techniques for Transformer Active Reset Circuits at High Frequencies and Power Levels" by Bruce Carsten; May 1990; pp. 235–246.

*Primary Examiner*—Matthew Nguyen

[57] ABSTRACT

For use with a power converter couplable to a source of electrical power and having a power switch coupled to a primary and tertiary winding of a transformer, the power switch capable of impressing an input voltage (Vin) across the primary winding and a duty cycle (D) of the power switch limited by a voltage applied to reset the transformer, a clamp circuit and method of increasing an efficiency of the power converter. In one embodiment, the clamp circuit includes: (1) first and second storage devices coupled between the primary and tertiary windings and (2) a switching circuit, coupled between the first and second storage devices, that selectively couples the first and second storage devices in a parallel configuration when the power switch is conducting and in a series configuration when the power switch is not conducting, thereby increasing the voltage to reset the transformer and increasing the duty cycle (D) to improve an efficiency of the power converter.

20 Claims, 1 Drawing Sheet

CLAMP CIRCUIT FOR A POWER CONVERTER AND METHOD OF OPERATION THEREOF

TECHNICAL FIELD OF THE INVENTION

The present invention is directed, in general, to power supplies and, more specifically, to a clamp circuit for a power converter, method of operation thereof and power converter employing the clamp circuit.

BACKGROUND OF THE INVENTION

Increased power density is a continuing goal of modern power supply design. High power density is particularly crucial in applications wherein the allocated space for the power supply relative to the power output is restricted. In addition to being highly compact, the power supply must also be efficient to limit heat-creating power dissipation.

In low to medium level power applications (e.g., 30 to 800 watts), a forward converter topology is widely used. A DC/DC forward converter generally includes an isolation transformer, a switch on a primary side of the transformer, and a rectifier and output filter on a secondary side of the transformer. The switch, coupled in series with a primary winding of the transformer, converts an input DC voltage into an AC voltage. The transformer then transforms the AC voltage to another value and the rectifier generates therefrom a desired DC voltage that is filtered by the output filter at an output of the forward converter.

A practical concern regarding forward converters is that a magnetizing current of the transformer must be taken into consideration during the design of the converter. Otherwise, the magnetic energy stored in a core of the transformer by the magnetizing current may cause a failure in the converter. One approach of recovering the magnetic energy (to reduce the deleterious effects associated therewith) includes a reset topology wherein a tertiary reset winding is added to the transformer.

In a forward converter employing a typical reset topology, as the switch conducts, a transformer magnetizing current rises, storing magnetizing energy in a core of the transformer. During a complementary interval, the switch is turned off. During this period, the stored magnetizing energy is recovered and returned to the source of DC power via the tertiary reset winding and a diode (coupled thereto), thereby resetting the transformer.

One inherent problem with the reset topology is the maximum reset voltage for the transformer. At a 0.5 duty cycle for the switch, for instance, a drain-to-source voltage across the switch must be at least twice the input voltage. By operating the switch at less than the 0.5 duty cycle, the selection criteria for the switch and the turns ratio of the transformer are limited. Obviously, the aforementioned limitations detract from the use of forward converters and raise the costs associated therewith.

Accordingly, what is needed in the art is a system and method for recovering the magnetic energy stored in the transformer core and resetting the transformer while, at the same time, maximizing the design flexibility and increasing the efficiency of the power converter.

SUMMARY OF THE INVENTION

To address the above-discussed deficiencies of the prior art, the present invention provides for use with a power converter couplable to a source of electrical power and having a power switch coupled to a primary and tertiary winding of a transformer, the power switch capable of impressing an input voltage (Vin) across the primary winding and a duty cycle (D) of the power switch limited by a voltage applied to reset the transformer, a clamp circuit, method of increasing an efficiency of the power converter and a power converter employing the same. In one embodiment, the clamp circuit includes: (1) first and second storage devices coupled between the primary and tertiary windings and (2) a switching circuit, coupled between the first and second storage devices, that selectively couples the first and second storage devices in a parallel configuration when the power switch is conducting and in a series configuration when the power switch is not conducting, thereby increasing the voltage to reset the transformer and increasing the duty cycle (D) to improve an efficiency of the power converter.

The present invention, therefore, introduces a clamp circuit for a power converter that reconfigures the first and second storage devices depending on an operational state of the power switch to ultimately increase the voltage to reset the transformer. Concurrently, the clamp circuit increases a maximum allowable duty cycle (D) of the power switch. Those skilled in the art understand that one of the effects of increasing the duty cycle (D) of the power switch is that an overall efficiency of the power converter can be increased.

In one embodiment of the present invention, the first and second storage devices are capacitors. Of course, any storage device may be employed and still be within the broad scope of the present invention.

In one embodiment of the present invention, the switching circuit includes a diode coupled between a node intermediate to the first and second energy storage devices and the primary winding. In a related, but alternative embodiment, the switching circuit includes a diode coupled between the first and second energy storage devices. In a related, but alternative embodiment, the switching circuit includes a diode coupled between a node intermediate to the first and second energy storage devices and the tertiary winding.

In one embodiment of the present invention, a maximum duty cycle (D) of the power switch is represented by sqrt(2)/(1+sqrt(2)). Consequently, the maximum duty cycle (D) of the power switch is about 0.58 thereby allowing the power switch to conduct for a longer period of time and, at the same time, increasing the voltage to reset the transformer.

In one embodiment of the present invention, the first and second storage devices include a plurality of storage devices (n) coupled between the primary and tertiary windings and a maximum duty cycle (D) of the power switch is represented by sqrt(n)/(1+sqrt(n)). Therefore, by increasing the number of storage devices in the clamp circuit the maximum duty cycle (D) of the power switch may be increased even further thereby, ultimately, bolstering design flexibility.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
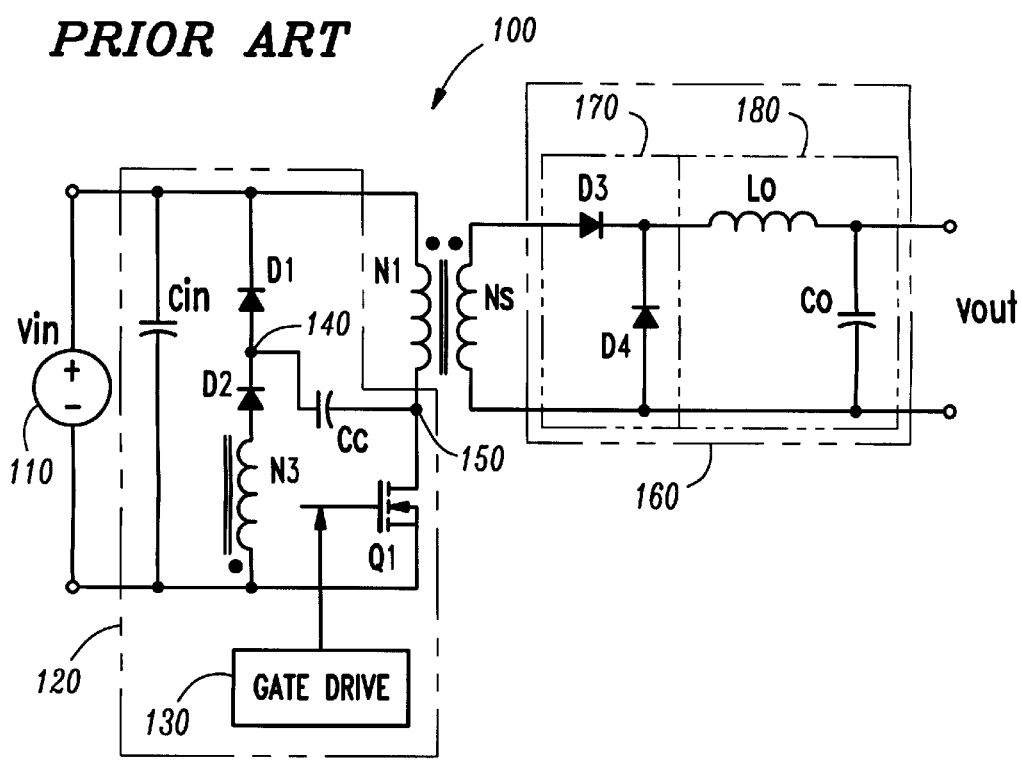
FIG. 1 illustrates a forward converter employing a prior art capacitor clamp reset topology.

Referring initially to FIG. 1, illustrated is a forward converter 100 employing a prior art capacitor clamp reset topology. The forward converter 100 includes an isolation transformer having primary, secondary, and tertiary reset windings N1, Ns, N3. The forward converter 100 further includes a primary side circuit 120 and a secondary side circuit 160. An input of the forward converter 100 is couplable to a source of DC power 110 having an input voltage Vin. An output of the forward converter 100 provides an output voltage Vout to a load (not shown).

The primary side circuit 120 includes an input capacitor Cin, coupled across the input. The primary side circuit 120 further includes first and second diodes D1, D2, serially coupled to the tertiary winding N3. The first and second diodes D1, D2, and the tertiary winding N3 are parallel coupled across the input. The primary side circuit 120 further includes a switch Q1 that is serially coupled to the primary winding N1. The switch Q1 and the primary winding N1 are also parallel coupled across the input. The primary side circuit 120 further includes a gate drive circuit 130 that controls the conduction periods of the switch Q1, as required. The primary side circuit 120 still further includes a clamp capacitor Cc, coupled between a first node 140, intermediate to the first and second diodes D1, D2, and a second node 150, intermediate to the primary winding N1 and the switch Q1.

The secondary side circuit 160 includes an output rectifier 170, consisting of rectifying diodes D3, D4, coupled across the secondary winding Ns. The secondary side circuit 160 still further includes an output filter 180, consisting of an output inductor Lo and an output capacitor Co, coupled across the output. The output rectifier 170 and the output filter 180 are well known in the art and, as a result, will not be described in detail.

The forward converter 100 operates as follows. During a first interval, the gate drive circuit 130 turns on the switch Q1 to apply the input voltage Vin across the primary winding N1. With the switch Q1 on, a magnetizing current associated with the transformer rises as energy is stored in the transformer. Then, during a complementary interval, the gate drive circuit 130 turns off the switch Q1. The clamp capacitor Cc absorbs the energy stored in the leakage inductance of the transformer and limits the voltage stress across the switch Q1 to a clamp voltage Vcc across the clamp capacitor Cc and the input voltage Vin. While the switch Q1 is off, transient energy is recovered and returned to the input via the clamp capacitor Cc. Magnetizing energy, stored in the transformer by the magnetizing current, is also recovered and returned to the input via the tertiary reset winding N3 and the first and second diodes D1, D2, thereby resetting the transformer.

The clamp capacitor Cc thus reduces a voltage stress across the switch Q1. The clamp voltage Vcc across the clamp capacitor Cc is determined by a turns ratio between the primary winding N1 and the tertiary reset winding N3. For transformers having a tertiary reset winding N3 that contains fewer turns than the primary winding N1, the clamp voltage Vcc may be represented as Vcc=(N3/N1)*Vin. Alternatively, for transformers having a tertiary reset winding N3 that contains more turns than the primary winding N1, the clamp voltage Vcc may be represented as Vcc=(N1/N3)*Vin. In either case, a maximum clamp voltage Vcc is less than or equal to the input voltage Vin. The duty cycle of the switch Q1, therefore, is limited to a maximum of 0.5.

The alternate switching action of the switch Q1 thus converts the input voltage Vin into an AC voltage required to operate the transformer. The transformer then scales the AC voltage to an appropriate value. The scaled AC voltage is then rectified by the rectifier 170 and filtered by the output filter 180 to produce the output voltage Vout.

Obviously, increased efficiency is a continuing goal in the design of forward converters. One way to increase efficiency is to increase the maximum duty cycle of the switch Q1 of the forward converter beyond 0.5; an increased duty cycle may result in an increased transformer turns ratio thereby further increasing the efficiency of the forward converter 100.

Figure 2:
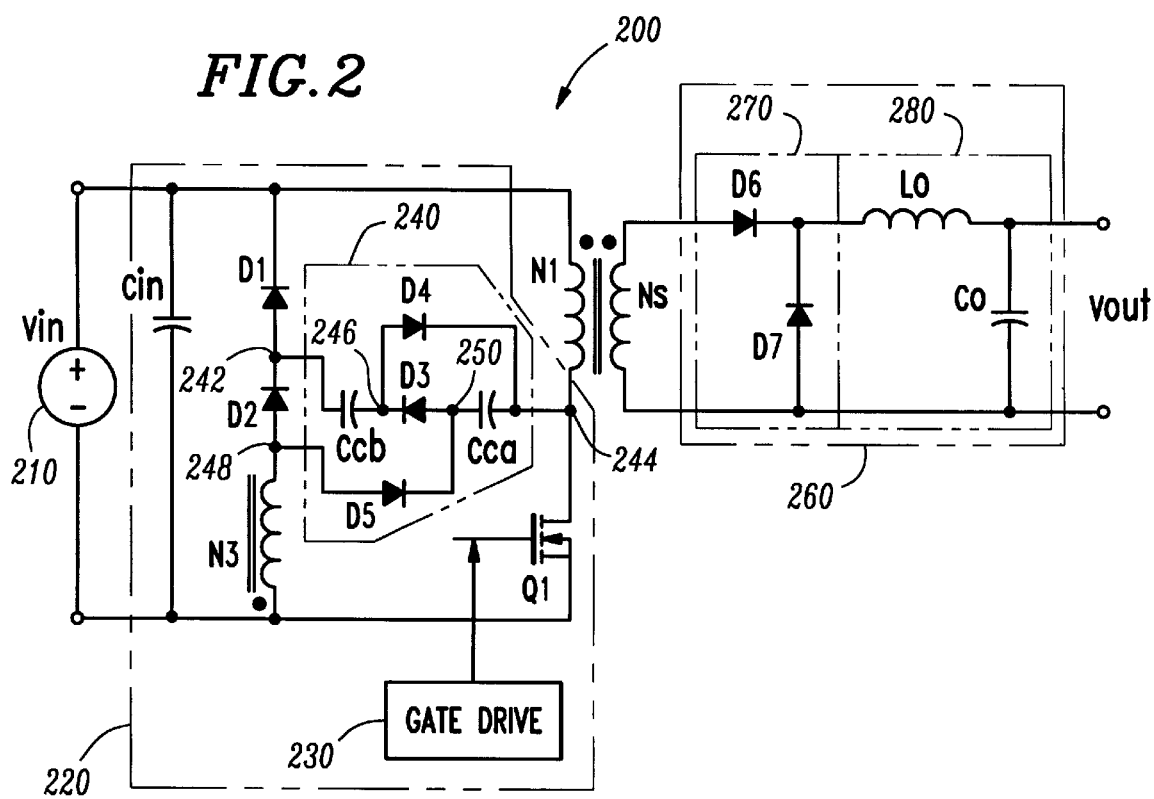
FIG. 2 illustrates an embodiment of a forward converter constructed according to the principles of the present invention.

Turning now to FIG. 2, illustrated is an embodiment of a forward converter 200 constructed according to the principles of the present invention. The forward converter 200 includes an isolation transformer having primary, secondary, and tertiary reset windings N1, Ns, N3. The forward converter 200 further includes a primary side circuit 220 and a secondary side circuit 260. An input of the forward converter 200 is couplable to a source of DC power 210 having an input voltage Vin. An output of the forward converter 200 provides an output voltage Vout to a load (not shown).

The primary side circuit 220 includes an input capacitor Cin, coupled across the input. The primary side circuit 220 further includes first and second diodes D1, D2, serially coupled to the tertiary winding N3. The first and second diodes D1, D2, and the tertiary winding N3 are parallel coupled across the input. The primary side circuit 220 further includes a switch Q1 that is serially coupled to the primary winding N1. The switch Q1 and the primary winding N1 are also parallel coupled across the input. The primary side circuit 220 further includes a gate drive circuit 230 that controls the conduction periods of the switch Q1, as required. The primary side circuit 220 still further includes a clamp circuit 240.

The clamp circuit 240 includes first and second clamp capacitors Cca, Ccb, serially coupled, via a third diode D3. The first and second clamp capacitors Cca, Ccb and the third diode D3 are coupled between a first node 242, intermediate to the first and second diodes D1, D2, and a second node 244, intermediate to the primary winding N1 and the switch Q1. The clamp circuit 240 further includes a fourth diode D4, coupled between a third node 246, intermediate to the second clamp capacitor Ccb and the third diode D3, and the second node 244. The clamp circuit 240 still further includes a fifth diode D5, coupled between a fourth node 248, intermediate to the tertiary reset winding N3 and the second diode D2, and a fifth node 250, intermediate to the third diode D3 and the first clamp capacitor Cca. In the illustrated embodiment, the third, fourth and fifth diodes D3, D4, D5 constitute a switching circuit that selectively couples the first and second clamp capacitors Cca, Ccb in a parallel or series configuration as will be described in greater detail below. Of course, other switching configurations and devices may be employed and still be within the broad scope of the present invention.

The secondary side circuit 260 includes an output rectifier 270 and an output filter 280. Both the output rectifier 270 and the output filter 280 are well known in the art and, as a result, will not herein be discussed further.

The forward converter 200 operates as follows. During a first interval, the gate drive circuit 230 turns on the switch Q1 to apply the input voltage Vin across the primary winding N1. The input voltage Vin reverse biases the third diode D3, causing it to turn off. The fourth and fifth diodes D4, D5, however, are forward biased and turn on to provide parallel paths for the second and first clamp capacitors Ccb, Cca, respectively. The first and second clamp capacitors Cca, Ccb are thus in a parallel configuration. Energy stored in the second clamp capacitor Ccb discharges through the fourth diode D4 and the switch Q1. Similarly, the fifth diode D5 allows energy stored in the first clamp capacitor Cca to also discharge through the switch Q1. With the switch Q1 on, a magnetizing current associated with the transformer rises as energy is stored in the transformer.

During a complementary interval, the gate drive circuit 230 turns off the switch Q1. With the input voltage Vin no longer applied across the primary winding N1, the fourth and fifth diodes D4, D5 are now reverse biased. The third diode D3 is forward biased and turns on to provide a path between the first and second clamp capacitors Cca, Ccb, thereby placing the first and second clamp capacitors Cca, Ccb in a series configuration. The first and second clamp capacitors Cca, Ccb may thus absorb energy in the leakage inductance of the transformer and clamp the voltage across the switch Q1 to about the input voltage Vin and twice a clamp voltage Vcc across the first and second clamp capacitors Cca, Ccb. While the switch Q1 is off, transient energy is recovered and returned to the input via the first and second clamp capacitors Cca, Ccb. In addition, energy stored in the transformer may now be recovered and returned to the input to reset the transformer.

The first and second clamp capacitors Cca, Ccb clamp the voltage across the switch Q1, providing relief from excessive voltage stress during turn-off of the switch Q1. The clamp voltage Vcc across the first and second clamp capacitors Cca, Ccb is determined by a turns ratio between the primary winding N1 and the tertiary reset winding N3. The first and second clamp capacitors Cca, Ccb appear in parallel (while the switch Q1 is on) and in series (while the switch Q1 is off). Therefore, even though a voltage across the first and second clamp capacitors Cca, Ccb is individually less than the input voltage Vin, a maximum clamping voltage Vcc may be greater than the input voltage Vin.

The illustrated embodiment contains two clamp capacitors. The maximum reset voltage is therefore equal to sqrt(2)*Vin, resulting in a duty cycle of about D=sqrt(2)/(1+sqrt(2))=0.58. In such instances, the efficiency of the power converter may be increased in the range of 1 to 2 percent. Those skilled in the art will realize, however, that the clamp circuit 240 may also be implemented with more than two clamp capacitors. For a clamp circuit employing n clamp capacitors, a maximum reset voltage may be represented as Vin*sqrt(n). The use of more clamp capacitors result in a higher maximum reset voltage and, therefore, an increased maximum duty cycle represented by D=sqrt(n)/(1+sqrt(n)).

Those skilled in the art should understand that the previously described embodiments of the forward converter and clamp circuit are submitted for illustrative purposes only and other embodiments capable of increasing the duty cycle of the power switch (preferably, above 0.5) are well within the broad scope of the present invention. Additionally, exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa. Similarly, although a magnetic device having a single core and a single primary winding has been illustrated, other configurations, such as magnetic devices having multiple primary windings or multiple cores, may be used to accomplish essentially the same results disclosed by the present invention. Also, the concepts of the present invention may be employed with other circuit topologies.

For a better understanding of power electronics, including power rectifiers and boost converters, see *Power Electronics: Converters, Applications and Design*, by N. Mohan, T. M. Undeland and W. P. Robbins, John Wiley & Sons Publishing Company (1989), incorporated herein by reference.

Although the present invention has been described in detail, those skilled in the art should understand that they can make various changes, substitutions and alterations herein without departing from the spirit and scope of the invention in its broadest form.

What is claimed is:

1. For use with a power converter couplable to a source of electrical power and having a power switch coupled to a primary and tertiary winding of a transformer, said power switch capable of impressing an input voltage (Vin) across said primary winding and a duty cycle (D) of said power switch limited by a voltage applied to reset said transformer, a clamp circuit, comprising:

first and second storage devices coupled between said primary and tertiary windings; and a switching circuit, coupled between said first and second storage devices, that selectively couples said first and second storage devices in a parallel configuration when said power switch is conducting and in a series configuration when said power switch is not conducting, thereby increasing said voltage to reset said transformer and increasing said duty cycle (D) to improve an efficiency of said power converter.

2. The clamp circuit as recited in claim 1 wherein said first and second storage devices are capacitors.

3. The clamp circuit as recited in claim 1 wherein said switching circuit comprises a diode coupled between a node intermediate to said first and second energy storage devices and said primary winding.

4. The clamp circuit as recited in claim 1 wherein said switching circuit comprises a diode coupled between said first and second energy storage devices.

5. The clamp circuit as recited in claim 1 wherein said switching circuit comprises a diode coupled between a node intermediate to said first and second energy storage devices and said tertiary winding.

6. The clamp circuit as recited in claim 1 wherein a maximum duty cycle (D) of said power switch is represented by sqrt(2)/(1+sqrt(2)).

7. The clamp circuit as recited in claim 1 wherein said first and second storage devices comprise a plurality of storage devices (n) coupled between said primary and tertiary windings and a maximum duty cycle (D) of said power switch is represented by sqrt (n)/(1+sqrt(n)).

8. For use with a power converter couplable to a source of electrical power and having a power switch coupled to a primary and tertiary winding of a transformer, said power switch capable of impressing an input voltage (Vin) across said primary winding and a duty cycle (D) of said power switch limited by a voltage applied to reset said transformer, a method for increasing said duty cycle (D), comprising the steps of:

coupling first and second storage devices between said primary and tertiary windings; and selectively coupling said first and second storage devices in a parallel configuration when said power switch is conducting and in a series configuration when said power switch is not conducting, thereby increasing said voltage to reset said transformer and increasing said duty cycle (D) to improve an efficiency of said power converter.

9. The method as recited in claim 8 wherein said first and second storage devices are capacitors.

10. The method as recited in claim 8 wherein said step of selectively coupling comprises the step of coupling a diode between a node intermediate to said first and second energy storage devices and said primary winding.

11. The method as recited in claim 8 wherein said step of selectively coupling comprises the step of coupling a diode between said first and second energy storage devices.

12. The method as recited in claim 8 wherein said step of selectively coupling comprises the step of coupling a diode between a node intermediate to said first and second energy storage devices and said tertiary winding.

13. The method as recited in claim 8 wherein a maximum duty cycle (D) of said power switch is represented by sqrt(2)/(1+sqrt(2)).

14. The method as recited in claim 8 wherein said first and second storage devices comprise a plurality of storage devices (n) coupled between said primary and tertiary windings and a maximum duty cycle (D) of said power switch is represented by sqrt (n)/(1+sqrt(n)).

15. A power converter couplable to a source of electrical power, comprising:

a power switch coupled to said source of electrical power;

a transformer having a primary, secondary and tertiary winding, said power switch capable of impressing an input voltage (Vin) across said primary winding and a duty cycle (D) of said power switch limited by a voltage applied to reset said transformer; and a clamp circuit, comprising:

first and second capacitors coupled between said primary and tertiary windings; and a switching circuit, coupled between said first and second capacitors, that selectively couples said first and second capacitors in a parallel configuration when said power switch is conducting and in a series configuration when said power switch is not conducting, thereby increasing said voltage to reset said transformer and increasing said duty cycle (D) to improve an efficiency of said power converter.

16. The power converter as recited in claim 15 wherein said switching circuit comprises a plurality of diodes interposed between said primary and tertiary windings.

17. The power converter as recited in claim 15 wherein a maximum duty cycle (D) of said power switch is represented by sqrt(2)/(1+sqrt(2)).

18. The power converter as recited in claim 15 wherein said first and second capacitors comprise a plurality of capacitors (n) coupled between said primary and tertiary windings and a maximum duty cycle (D) of said power switch is represented by sqrt(n)/(1+sqrt(n)).

19. The power converter as recited in claim 15 further comprising first and second diodes coupled to said tertiary winding, said clamp circuit coupled to said primary winding and a node between said first and second diodes.

20. The power converter as recited in claim 15 further comprising an output rectifier and an output filter, coupled to said secondary winding, that provides a conditioned DC voltage at an output of said power converter.

* * * * *